United States Patent [19]
Lewis

[11] 3,774,089
[45] Nov. 20, 1973

[54] TEMPERATURE INDICATING APPARATUS USING OPPOSITELY VARYING CAPACITORS

[75] Inventor: Howard B. Lewis, La Canada, Calif.

[73] Assignee: Bell & Howell Company, Chicago, Ill.

[22] Filed: Apr. 18, 1972

[21] Appl. No.: 245,057

[52] U.S. Cl. .............. 316/247, 317/248, 317/249 R
[51] Int. Cl. .............................................. H01g 7/00
[58] Field of Search ............... 317/247, 248, 249 R, 317/251

[56] References Cited
UNITED STATES PATENTS
3,460,011   8/1969   Kadlec ........................... 317/248 X

FOREIGN PATENTS OR APPLICATIONS
111,790   11/1940   Australia ........................... 317/248
620,184   3/1949   Great Britain .................... 317/247

Primary Examiner—E. A. Goldberg
Attorney—Robert L. Parker et al.

[57] ABSTRACT

A temperature sensitive transducer element includes a structure having a cavity. Each of a pair of inwardly facing conductive surfaces defining the cavity forms a plate of a different one of a pair of capacitors. A support member disposed in the cavity has a pair of outwardly facing conductive surfaces each forming the opposite plate of a different one of the two capacitors. As the ambient temperature varies, the support member translates relative to the structure along a line between the inwardly facing surfaces so that the capacitance of one of the capacitors increases and the capacitance of the other decreases. Preferably, each capacitor controls the frequency of oscillation of a different oscillator circuit. A mixer circuit responsive to the oscillator circuits produces a square wave the frequency of which is an analog indication of ambient temperature. A counting circuit converts the analog indication into a digital representation.

4 Claims, 3 Drawing Figures

TEMPERATURE INDICATING APPARATUS USING OPPOSITELY VARYING CAPACITORS

BACKGROUND OF THE INVENTION

1. Field of the Invention

This invention relates to variable-capacitance temperature transducers. It relates particularly to a circuit arrangement including a pair of capacitors having oppositely directed temperature coefficients of capacitance and providing a digital representation of the ambient temperature of the capacitors.

2. Description of the Prior Art

Transducers that provide an analog signal representative of ambient temperature are well known. For example, thermistors, which are resistors made of semiconductive material having a temperature sensitive resistance, have been used in bridge circuits and the like for providing temperature indicating analog signals. As another example, U.S. Pat. No. 2,011,710 discloses a transducer comprising a capacitor having a temperature sensitive dielectric material between the plates of the capacitor. Because the dielectric constant varies as a function of temperature, the capacitance between the plates also varies.

The performance of temperature transducers can be evaluated in terms of several factors. Deviation from linearity, for example, is a factor to be considered in evaluating performance. In many uses, it is desired to have the transducer cause the development of a signal that varies in a linear manner with respect to variations in temperature. Response time is another factor to be considered. Generally, it is desired that the signal developed in a temperature transducer arrangement indicate the present temperature; if the transducer is slow to respond to a change in temperature, the signal developed does not accurately indicate the present temperature during periods of changing temperature. Another factor relates to tolerances. It is not uncommon to have drastic differences between different transducer components made in accordance with the same specification. For this reason, the design of circuit arrangements that perform in a predictable manner is a difficult task because the tolerances must be taken into account.

Scale factor is another criterion to be evaluated. By scale factor is meant the percentage of change in a temperature transducer parameter (e.g. capacitance) caused by a specified change in temperature. Too low a scale factor makes it difficult to distinguish between temperature-caused changes and noise. Too high a scale factor, coupled with the inevitable limit on dynamic range of the transducer parameter, makes it difficult to measure a desired broad range of temperature.

For each of the different arrangements of prior art temperature transducers, it will be found that its performance, when evaluated in terms of one or more of these factors is not adequate to meet specifications imposed in many systems.

SUMMARY OF THE INVENTION

An important feature of the present invention resides in the provision of two capacitors each having a capacitance that is a function of ambient temperature, wherein the capacitance of one changes in one direction while the capacitance of the other changes in the opposite direction.

A temperature transducer element in accordance with this invention comprises a first and a second conductive surface. Nonconductive means mount the conductive surfaces to define opposing faces of a cavity. A support member is disposed in the cavity and has third and fourth conductive surfaces. The first and third surfaces are opposing and form plates of a first capacitor, and the second and fourth surfaces are opposing and form plates of a second capacitor. A plurality of signal leads are each connected to a different surface for connecting the two capacitors into an external circuit. Means responsive to variations in ambient temperature cause the support member to translate along a line between the first and second surfaces so that the capacitance of the first capacitor increases and the capacitance of the second capacitance decreases.

In a system embodiment, the invention includes two temperature sensitive capacitors each exposed to the same ambient temperature. The capacitances of the two capacitors vary in opposite directions responsive to variations in temperature. Each of the capacitors is connected in a different one of two variable frequency oscillator circuits. Both oscillator circuits are coupled to a circuit that provides an indicating signal that varies in accordance with variations in the difference in the oscillation frequencies of the oscillator circuits.

DETAILED DESCRIPTION

Figure 1:
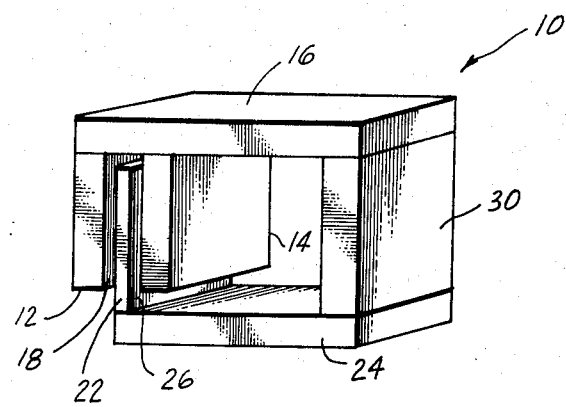
FIG. 1 is a perspective view of a temperature sensitive transducer element embodying this invention.
Figure 2:
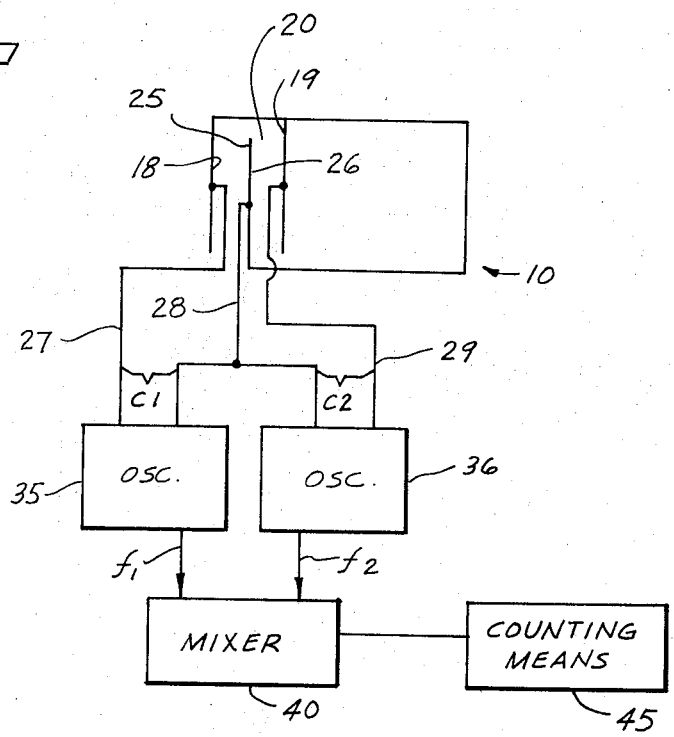
FIG. 2 is a block diagram of a temperature sensitive transducer system embodying this invention.

FIGS. 1 and 2 show in perspective and schematically, respectively, a temperature sensitive transducer element 10. In the orientation shown, rectangular slab portions 12 and 14 project downwardly from an upper horizontal slab portion 16. The slab portion 12 is joined to the bottom surface of the horizontal slab portion 16 at its left marginal edge. The slab portion 14 is also joined to that bottom surface but at a location somewhat to the right of the left marginal edge. Preferably, slab portions 12, 14, and 16 are each made of a material such as quartz so that they have a relatively low temperature coefficient of expansion.

A surface 18 of the slab portion 12 and a surface 19 of the slab portion 14 are conductive. Preferably, the surfaces 18 and 19 are made conductive by metalizing the exterior of the quartz material. As shown, the conductive surfaces 18 and 19 are each planar and are parallel to each other. Slab portion 16 serves as a securing member for joining and supporting surfaces 18 and 19 in essentially fixed relation to each other.

The conductive surfaces 18 and 19, mounted as they are by the non-conductive slabs 12, 14, and 16, define opposing faces of a cavity 20 which, in the preferred embodiment, has the shape of an elongated slot.

A support member 22, disposed in the cavity 20, projects upwardly from a lower horizontal slab portion 24. The support member 22 and the slab portion 24 are each made of a material such as ceramic or metal so that they have a relatively high temperature coefficient of expansion.

Conductive surfaces 25 and 26 of the support member 22 face the conductive surfaces 18 and 19, respectively, to define capacitors C1 and C2, respectively.

The conductive surfaces 25 and 26 can be electrically isolated from each other if desired so that the two capacitors can be used independently in different external circuits. Preferably, however, the conductive surfaces 25 and 26 are electrically connected together and operate at the same potential while in use. To effect this electrical connection the support member 22 may be a solid metallic piece. Alternatively, when the support member is made of ceramic or the like, its entire external surface can be metalized. Slab portion 24 serves as a carrier of the support member.

A signal lead 27 is electrically connected as by soldering, welding or the like to the conductive surface 18. A signal lead 28 is electrically connected to the surfaces 25 and 26, and a signal lead 29 is electrically connected to the conductive surface 19.

An upright rectangular support structure 30 supports the right marginal edge of the lower horizontal slab portion 24 and the right marginal edge of the upper horizontal slab portion 16. Accordingly, these two right marginal edges are maintained in relatively fixed spacial relationship in such manner that slab portions 16 and 24 undergo no significant angular relative motion with changing temperature. On the other hand, the left marginal edge of the lower slab portion 24 is free to move linearly relative to the upper horizontal slab portion 16. Such relative movement causes the support member 22 to translate along a line which is perpendicular to the surfaces 18 and 19.

When second order effects such as fringing and the like are ignored, the capacitance of a parallel place capacitor is given by the product of the dielectric constant of the medium between the plates and the effective area of the capacitor divided by the distance between the plates. Thus as the support member translates to the left, the capacitance of C1 increases and the capacitance of C2 decreases.

The following brief analysis indicates the effect of variations in temperature on the transducer element 10.

The lengths of the upper and lower horizontal slab portions 24 and 16 change by different amounts. The change $\Delta L_l$ of the lower horizontal slab portion 24 and the change $\Delta L\mu$ of the upper horizontal slab portion 16 are given by the equations:

$$\Delta L_l = (L)(a_l)(T-T_o) \qquad (1)$$

and $$\Delta L\mu = (L)(a\mu)(T-T_o) \qquad (2)$$

where $T_o$ is a reference temperature,
$a_l$ and $a\mu$ are the temperature coefficients of expansion of the upper and lower portions respectively, and
L is the length of each horizontal portion at the reference temperature (the fact that the lengths are not exactly equal at the reference temperature is ignored because this has an insignificant effect on the analysis). Subtracting Equation No. 2 from Equation No. 1 yields Equation No. 3

$$\Delta d = L(a_l - a\mu)(T-T_o) \qquad (3)$$

where $\Delta d$ is the amount of the translation of the support member relative to the cavity.

Depending upon the choice of materials, the quantity $(a_l - a\mu)$ can be as high as 12 parts per million (ppm) per degree fahrenheit or can be as low as 2 ppm per degree fahrenheit. For example, when an aluminum alloy material is used in lower slab portion 24 and quartz is used in upper slab portion 16, the differential expansion (or contraction) is relatively high. As another example, when a material such as quartz is used in the upper portion and Beryllia (BeO) is used in the lower portion, the differential expansion is relatively low.

In any event, a differential change in length causes the support member to translate in the cavity 20. This translation causes the gap between two facing surfaces forming one capacitor to increase and causes the gap between two facing surfaces forming the other capacitor to decrease.

The general equation for capacitance of a parallel plate capacitor is:

$$C = \epsilon A/d \qquad (4)$$

It follows then that

Equation #5
$$\frac{C_0 + \Delta C}{C_0} = \frac{\frac{\epsilon A}{d_0 - \Delta d}}{\frac{\epsilon A}{d_0}} = \frac{d_0}{d_0 - \Delta d}$$

and $$1 + \frac{\Delta C}{C_0} = 1 + \frac{\Delta d}{d_0} - \left(\frac{\Delta d}{d_0}\right)^2 + \cdots \pm \left(\frac{\Delta d}{d_0}\right)^n$$

and $$\Delta C/C_o = \Delta d/d_o \qquad (6)$$

the insignificant effects of higher order terms being ignored because $\Delta d$ is small compared to $d_o$.

Inspection of Equation No. 6 reveals that the percentage change in capacitance is equal to the percentage change in gap between the plates. Accordingly, it is a relatively easy task to select design dimensions to achieve a particular desired scale factor for the transducer element.

In FIG. 2, an oscillator 35 is shown in block diagram form. The frequency of oscillation $f_1$ of oscillator 35 is controlled by the capacitance C1. Another oscillator 36 has a frequency of oscillation $f_2$ that is controlled by the capacitance C2. A mixer circuit 40 is coupled to both oscillator circuits and produces at 42 a square wave output having a frequency equal to the difference between $f_1$ and $f_2$. Preferably, the frequency of oscillation of one of the oscillators, say oscillator 35, is always higher than the frequency of oscillation of the other oscillator. This avoids an ambiguity which would otherwise result.

Counting means 45 responds to the output of the mixer and provides a digital indication of the square wave frequency. Such counting means are well known and the specific construction thereof is not a part of this invention. Many instrument manufacturing companies such as Hewlett-Packard sell electronic counting instruments which are suitable for the arrangement of FIG. 2.

Figure 3:
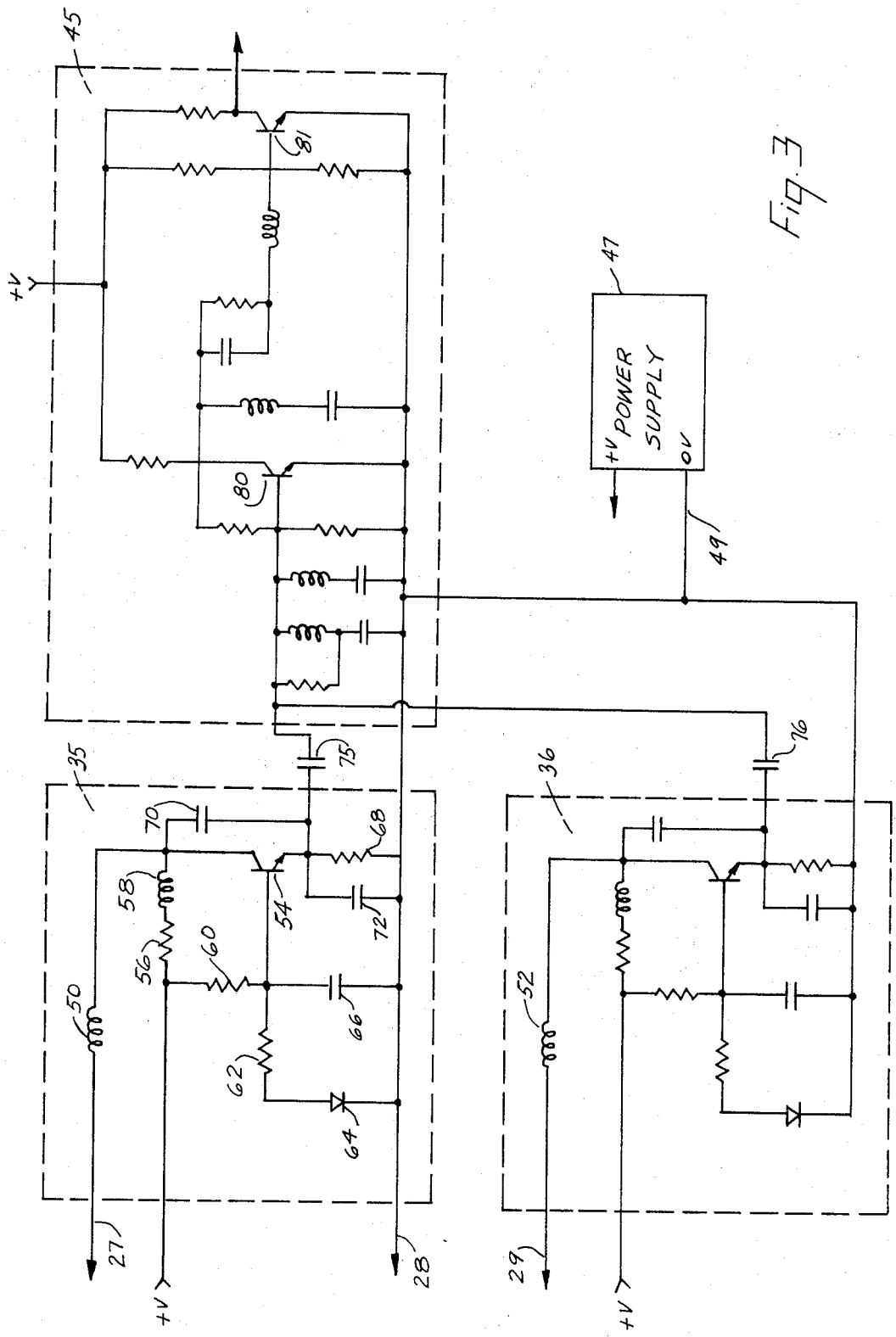
FIG. 3 is a schematic diagram of the preferred circuit arrangement used in an embodiment of this invention.

A presently preferred arrangement for the circuitry of the two oscillators 35 and 36 and the mixer circuit 40 is shown in FIG. 3.

Oscillators 35 and 36 and mixer 40 are each shown within a dashed block. A conventional power supply 47 has a ground (0 Volt) output and a +V output. The ground output is connected by a signal lead 49 to oscillators 35 and 36 and to the mixer 40. The +V output is connected by a signal lead (not shown) to provide DC power to the oscillators and the mixer.

In the oscillator 35, an inductor 50 has one end connected to the signal lead 27 which is connected to the conductive surface 18. The signal lead 28 which is connected to the conductive surfaces 25 and 26 is connected to ground by the signal lead 49.

In the oscillator 36, an inductor 52 has one end connected to the signal lead 29 which is connected to the conductive surface 19.

Each of the oscillators is of the type commonly called "Clapp oscillators." Since the two oscillators are in most respects identical only one (oscillator 35) is described in detail herein.

A transistor 54 has its collector electrode connected to one end of the inductor 50. A separate collector load circuit comprising a series connected resistor 56 and choke 58 couples the collector electrode to +V. Transistor 54 is biased into conduction in a conventional manner. To this end, a resistor divider network comprising resistors 60 and 62 and diode 64 is connected in series between +V and ground, and the base electrode of the transistor is connected to the junction of the resistors in the divider network. The diode 54 provides temperature compensation for temperature caused variations in the base-emitter junction voltage. A capacitor 66 is connected between the base electrode and ground and provides a very low impedance path at the frequency of oscillation. In this arrangement, transistor 54 operates in what is commonly called a common base configuration.

A resistor 68 is connected between the emitter electrode and ground to provide DC feedback to stabilize the DC operating point of transistor 54.

The circuit elements that control the frequency of oscillation of oscillator 35 are the inductor 50, the capacitor C1, a capacitor 70, and a capacitor 72. The inductor 50 and the capacitor C1 are connected to form a series circuit between the collector electrode and ground. The capacitors 70 and 72 are connected in series with respect to each other and in parallel with respect to the series circuit.

The design of the oscillator 35 is such that the capacitance values of each of capacitors 70 and 72 is much larger than the maximum capacitance of the variable capacitance of C1. By way of example, capacitors 72 and 74 may each be 360 pf capacitors and the capacitance of C1 may be 33 pf at a reference temperature. With these values, and a value of 0.35 μh for the inductor 50, the oscillator 35 will have a nominal oscillation frequency of about 52 megahertz.

The oscillation frequency of oscillator 35 changes from the nominal frequency approximately in accordance with the following equation:

$$f = f_o/(1 + r)^{1/2} \qquad (7)$$

where $f_o$ is the nominal oscillation frequency and $r$ is the ratio of the change in capacitance of C1 to the nominal value of C1.

Preferably, the value of $r$ varies in a range between 0 and 0.15. By way of example, if it is desired to measure a temperature range of 1,500° F, the value of $r$ can be kept within the preferred range by using Beryllia as the material in the lower portion of the transducer element 10 and using quartz as the material in the upper portion therof. If it is desired to measure a temperature range of 25° F, an aluminum alloy can be used in the lower portion thereof.

Inspection of Equation No. 7 reveals that the oscillation frequency is a non-linear function of $r$. Accordingly, the rate of change in frequency of an individual one of the oscillators 35 and 36 with respect to temperature is non-linear also. However, when the two oscillation frequencies are mixed together, the beat frequency obtained is a substantially linear function of ambient temperature.

The outputs of oscillators 35 and 36 are coupled to the mixer 40 by capacitors 75 and 76 respectively. In the mixer, the capacitors 75 and 76 are each connected to the base electrode of a transistor 80. Conventional tuning networks and a conventional bias network are provided to cause transistor 80 to produce at its collector electrode an oscillating signal at a frequency equal to the difference between the oscillation frequencies of oscillators 35 and 36. A transistor 81 shapes this oscillating signal into a square wave for use by the counting means 45.

I claim:

1. A variable-capacitance, temperature-indicating element comprising:

a first and a second conductive surface, non-conductive means mounting the conductive surfaces to define opposing faces of a cavity;

a support member disposed in the cavity between the conductive surfaces and having third and fourth conductive surfaces spaced from and opposing the first and second conductive surfaces, respectively, thereby to define first and second capacitors, a plurality of signal leads each connected to a different one of the conductive surfaces for separately connecting the first and second capacitors into an external operating electrical circuit; and means responsive to variations in ambient temperature for translating the support member along a line between the first and second surfaces so that the capacitance of the first capacitor increases and the capacitance of the second capacitor decreases with the capacitance of each capacitor changing in an amount sufficient to differentially affect the operation of the external circuit thereby to provide an indication of the ambient temperature.

2. A transducer element according to claim 1 wherein the first and second conductive surfaces are each substantially planar and are parallel to each other, and wherein the translating means translates the support member along a line perpendicular to the first and second conductive surfaces.

3. A transducer element according to claim 1 wherein the translating means includes a carrier member having one end joined to the support member and an opposite end held in substantially fixed spacial relationship with the cavity, the carrier member responding to variations in ambient temperature to change the spacing between its ends, thereby to translate the support member.

4. A temperature transducer element according to claim 1, wherein the non-conductive means includes a securing member having opposite end portions one of which joins the first to the second conductive surface, and the translating means includes a carrier member having one end joined to the support member and an opposite end portion held in fixed spacial relationship with the other end portion of the securing member, the securing member having a different temperature coefficient of expansion from the carrier member so that they expand and contract by different amounts responsive to variations in ambient temperature.

* * * * *

PO-1050
(5/69)

UNITED STATES PATENT OFFICE
CERTIFICATE OF CORRECTION

Patent No. 3,774,089　　　　　　　　Dated November 20, 1973

Inventor(s) Howard B. Lewis

It is certified that error appears in the above-identified patent and that said Letters Patent are hereby corrected as shown below:

Column 5, line 66, Equation (7) should contain in the denominator the number 1 and not the letter l.

Column 6, line 58, delete "transducer" and insert --temperature-indicating--;

Column 6, line 64, delete "transducer" and insert --temperature-indicating--;

Column 7, line  4, delete "temperature transducer" and insert --temperature-indicating--.

Signed and sealed this 23rd day of April 1974.

(SEAL)
Attest:

EDWARD M.FLETCHER,JR.　　　　　　C. MARSHALL DANN
Attesting Officer　　　　　　　　Commissioner of Patents

Disclaimer

3,774,089.—*Howard B. Lewis*, La Canada, Calif. TEMPERATURE INDI-
CATING APPARATUS USING OPPOSITELY VARYING
CAPACITORS. Patent dated Nov. 20, 1973. Disclaimer filed June 27,
1974, by the assignee, *Bell & Howell Company*.

Hereby enters this disclaimer to claims 1, 2 and 3 of said patent.

[*Official Gazette July 1, 1975.*]